(12) United States Patent
Helvick

(10) Patent No.: US 7,925,241 B2
(45) Date of Patent: Apr. 12, 2011

(54) USING PIM CALENDAR ON A MOBILE DEVICE TO CONFIGURE A PROFILE

(75) Inventor: Richard Eric Helvick, Portland, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 20 days.

(21) Appl. No.: 11/103,689

(22) Filed: Apr. 12, 2005

(65) Prior Publication Data

US 2006/0099937 A1 May 11, 2006

Related U.S. Application Data

(63) Continuation-in-part of application No. 10/985,220, filed on Nov. 9, 2004, now abandoned.

(51) Int. Cl.
*H04M 1/663* (2006.01)
(52) U.S. Cl. .............. 455/412.2; 455/412.1; 455/413; 455/414.1; 455/416; 455/567
(58) Field of Classification Search .............. 455/412.1, 455/412.2, 413, 418
See application file for complete search history.

(56) References Cited

U.S. PATENT DOCUMENTS

| | | | |
|---|---|---|---|
| 5,933,778 A | 8/1999 | Buhrmann et al. | |
| 6,085,098 A | 7/2000 | Moon et al. | |
| 6,459,913 B2 | 10/2002 | Cloutier | |
| 6,477,374 B1 | 11/2002 | Shaffer et al. | |
| 6,480,830 B1 | 11/2002 | Ford et al. | |
| 6,553,100 B1 | 4/2003 | Chen et al. | |
| 6,618,716 B1 | 9/2003 | Horvitz | |
| 6,640,230 B1 | 10/2003 | Alexander et al. | |
| 6,658,268 B1 | 12/2003 | Bodnar et al. | |
| 6,662,199 B1 | 12/2003 | Flight et al. | |
| 6,668,177 B2 | 12/2003 | Salmimaa et al. | |
| 6,831,970 B1 * | 12/2004 | Awada et al. | 379/201.01 |
| 6,928,300 B1 * | 8/2005 | Skinner et al. | 455/556.2 |
| 7,653,380 B2 * | 1/2010 | Graefen | 455/414.1 |
| 2002/0072394 A1 * | 6/2002 | Muramatsu | 455/566 |
| 2002/0132610 A1 * | 9/2002 | Chaplin et al. | 455/414 |
| 2003/0134626 A1 * | 7/2003 | Himmel et al. | 455/419 |
| 2004/0097218 A1 * | 5/2004 | Vossler | 455/418 |
| 2004/0203768 A1 * | 10/2004 | Ylitalo et al. | 455/435.1 |
| 2006/0030302 A1 * | 2/2006 | Andrew et al. | 455/414.1 |
| 2008/0045195 A1 * | 2/2008 | Cortegiano | 455/414.3 |

FOREIGN PATENT DOCUMENTS

| | | |
|---|---|---|
| JP | 04-363750 | 12/1992 |
| JP | 2001-224075 | 8/2001 |
| JP | 2002-111794 | 4/2002 |
| JP | 2003-078944 | 3/2003 |

* cited by examiner

*Primary Examiner* — Dai A Phuong
(74) *Attorney, Agent, or Firm* — Austin Rapp & Hardman

(57) ABSTRACT

A method of automatically changing a profile in a mobile communication device, wherein the mobile communication device is equipped with a calendar mechanism includes setting an event begin time and an event end time in the calendar mechanism; selecting an event profile to be in use during the event; detecting the beginning time for the event; recording and storing the profile in effect prior to the event begin time; activating the selected event profile to be in use during the event; detecting the end time for the event and restoring the profile in effect prior to the event begin time; which includes, during mobile communication device power on, detecting whether an event is in progress and selecting an event profile to be in use during the event; and detecting whether an event which was in progress at a last mobile communication device power off has ended, and selecting a profile to be in use at the time of the mobile communication device power on.

19 Claims, 1 Drawing Sheet

USING PIM CALENDAR ON A MOBILE DEVICE TO CONFIGURE A PROFILE

RELATED APPLICATIONS

This Application is a continuation-in-Part of Ser. No. 10/985,220, filed Nov. 9, 2004 now abandoned, for USING PIM CALENDAR ON A MOBILE DEVICE TO CONFIGURE THE USER PROFILE.

FIELD OF THE INVENTION

This invention relates to mobile communication devices, and specifically to the provision of a calendar equipped mobile communication device wherein the calendar is used to change selected profiles according to scheduled events.

BACKGROUND OF THE INVENTION

Modern mobile communication devices, such as mobile phones, PDAs, etc., have a feature to create and manage profiles. Each profile groups together settings for various options of the device which affect its behavior for alerting the user to various conditions, including, but not limited to, incoming calls and arrival of new messages. An example might be a profile containing "quiet" settings for all types of alerts which would be used when the user is in a meeting. To select a profile, the user generally must access the device's user interface (UI) and select the desired option. Many mobile communication devices contain some form of basic Personal Information Manager (PIM), which likely includes a user's calendar for scheduling events. This invention makes use of a user's calendar to automatically select a profile according to the events in the calendar. Although many patents describe various uses of an embedded calendar or scheduling mechanism, a teaching of a profile selection mechanism driven by a calendar is not known in the prior art.

U.S. Pat. No. 6,668,177 to Salmimaa et al., granted Dec. 23, 2003, for Method and apparatus for displaying prioritized icons in a mobile terminal, describes using the time of day or the user profile to determine which icons to display.

U.S. Pat. No. 6,662,199 to Flight et al, granted Dec. 9, 2003, for Method and apparatus for customized hosted applications, describes use of a base table and a user table to retrieve settings for applications.

U.S. Pat. No. 6,658,268 to Bodnar et al., granted Dec. 2, 2003, for Enhanced companion digital organizer for a cellular phone device, describes attaching an external device to a mobile phone which will give the mobile phone the functionality of a "smart phone."

U.S. Pat. No. 6,553,100 to Chen et al., granted Apr. 22, 2003, for Intelligent alerting systems, describes the use of an intelligent processor to route alerts to various devices and to detect and handle alerts during a device malfunction.

U.S. Pat. No. 6,480,830 to Ford et al., granted Nov. 12, 2002, for Active calendar system, describes use of an active calendar that generates a machine readable file for use by an external resource(s), related to calendar entries.

U.S. Pat. No. 6,477,374 to Shaffer et al., granted Nov. 5, 2002, for Apparatus and method for calendar based call routing, describes the use of a user calendar, which is queried when a call reaches the PBX, to determine where to forward the call.

U.S. Pat. No. 6,459,913 to Cloutier, granted Oct. 1, 2002, for Unified alerting device and method for alerting a subscriber in a communication network based upon the result of logical functions, describes a method of using a user profile to filter alerts to one or more user devices.

U.S. Pat. No. 6,640,230 to Alexander et al., granted Oct. 28, 2003, for Calendar-driven application technique for preparing responses to incoming events, describes use of a calendar to determine how to handle income messages, e.g., EMail, voice calls, etc. An EMail application may, e.g., detect from the calendar that the user is on vacation and automatically set an "out of office" flag.

U.S. Pat. No. 6,618,716 to Horvitz, granted Sep. 9, 2003, for Computational architecture for managing the transmittal and rendering of information, alerts, and notifications, describes an architecture for handling alerts and notifications to the user. This system throttles the notifications to prevent the user from being bombarded by information.

U.S. Pat. No. 6,085,098 to Moon et al., granted Jul. 4, 2000, for Apparatus and method for automatically configuring settings of a software application in a portable intelligent communications device, describes configuring the settings of an application on a portable device based on the geographical location of the device.

U.S. Pat. No. 5,933,778 to Buhrmann et al., granted Aug. 3, 1999, for Method and apparatus for providing telecommunication services based on a subscriber profile updated by a personal information manager, describes the use of a PIM on a device to generate a profile of the user, which may be used by a network to control telecommunication services.

SUMMARY OF THE INVENTION

A method of automatically changing a profile in a mobile communication device, wherein the mobile communication device is equipped with a calendar mechanism includes creating profiles in the mobile communication device; setting an event begin time and an event end time in the calendar mechanism; selecting an event profile to be in use during the event; detecting the beginning time for the event; recording and storing the profile in effect prior to the event begin time; activating the selected event profile to be in use during the event; detecting the end time for the event and restoring the profile in effect prior to the event begin time; wherein, during mobile communication device power on, detecting whether an event is in progress and selecting an event profile to be in use during the event; and during mobile communication device power on, detecting whether an event which was in progress at a last mobile communication device power off has ended, and selecting a profile to be in use at the time of the mobile communication device power on.

It is an object of the invention to provide a calendar-equipped mobile device, wherein the device automatically selects a predetermined option based on calendar events.

This summary and objectives of the invention are provided to enable quick comprehension of the nature of the invention. A more thorough understanding of the invention may be obtained by reference to the following detailed description of the preferred embodiment of the invention in connection with the drawings.

DETAILED DESCRIPTION OF THE PREFERRED EMBODIMENTS

Figure 1:
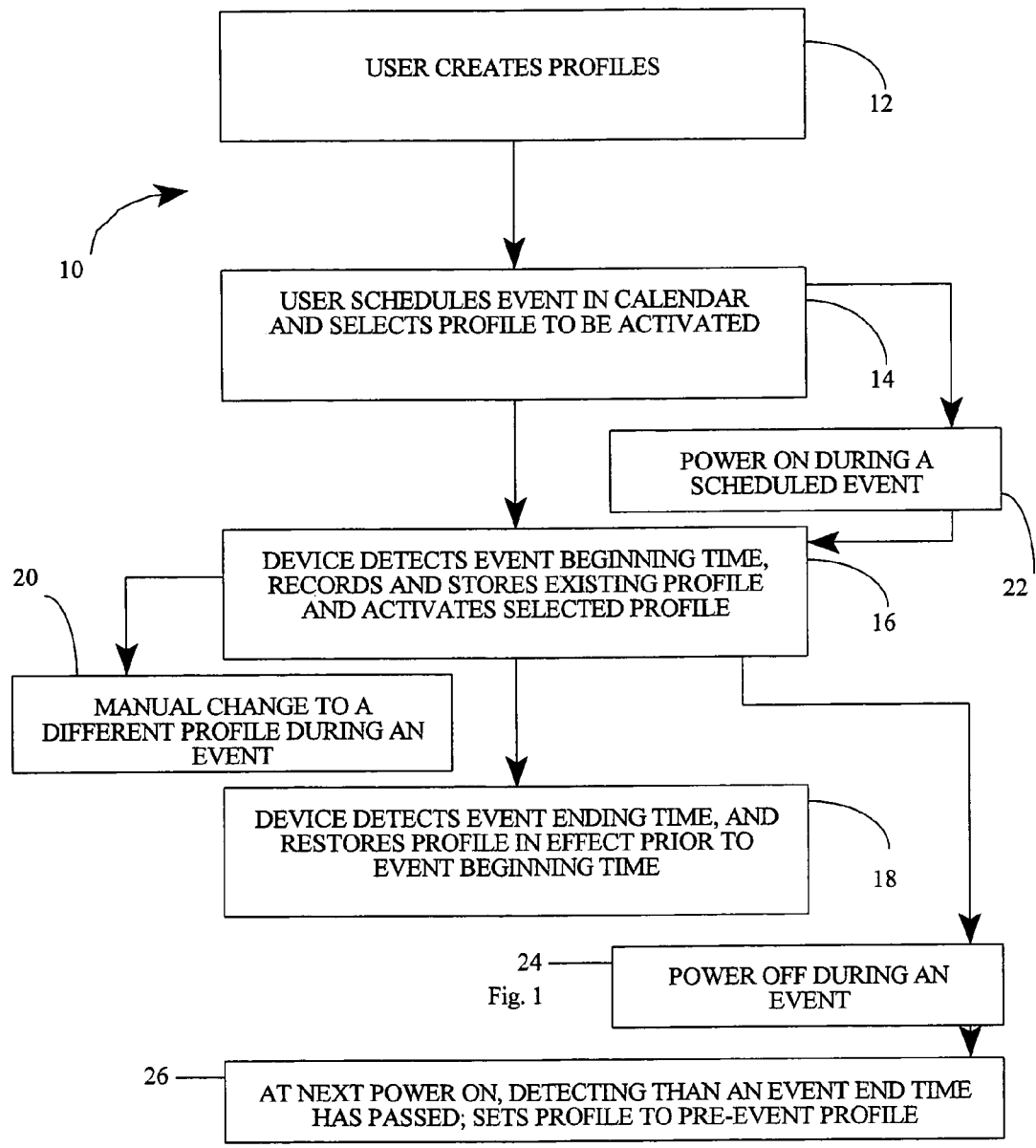
FIG. 1 is a block diagram of the method of the invention.

The method of the invention links a scheduled event in a calendar to a profile, so that the mobile communication device automatically sets itself to the desired event profile for that time period. The user's calendar controls selection of a profile in the phone, allows the user, or a control system, to schedule a meeting in the calendar and know that the mobile device will automatically change its settings at that time, and then change back to the user's original, nominal settings when the scheduled event is scheduled to be complete.

Referring now to FIG. 1, the method of the invention is depicted generally at 10. A user creates a number of profiles, 12, in a mobile communication device to accommodate the user's desires depending on the user's environment. These profiles may be provided in the communication device during manufacture and adopted by the user during initial communication device configuration, and may also be created by the user. The user selects a nominal profile to be in use during times when events are not scheduled. This profile may be changed according to the desires of a user, for instance, a soft ring profile may be selected when the user is at work, a loud ring profile may be selected when the user is a vehicle, and a vibrate-only ring profile may be selected if the user is traveling on public transit.

When the user schedules an appointment, referred to herein as an event, in the mobile communication device's calendar, a field is provided wherein the user is asked to select one of the communication device's profiles for use during the designated event's time period, 14, referred to herein as an event profile. When the scheduled event time occurs, the mobile communication device records the current, existing profile and activates the selected event profile designated by the user when setting the event, 16. When the event end time is reached, the mobile communication device restores the profile in effect prior to the event beginning time, 18.

There may be circumstances when a user needs to manually change the selected event profile during an event time, as when an event, such as a meeting, ends before the scheduled event end time. In such circumstances, the user may manually change to a different profile before the event ending time, 20.

The communication device is configured so that, whenever it is powered on, 22, it determines whether a scheduled event is in progress, and, if so, selects the event profile which is to be in effect during the event. If no event is scheduled, the device selects the nominal protocol which the user has selected.

As previously mentioned, the communication device determines, on power up, if a scheduled event is in progress, however, in a scenario where a user powers off a communication device, or if a battery should run out, during a scheduled event when a selected event profile is in effect, 24, the communication device is set to a selected event profile, which profile is activated at the next power up, unless, at the next power on, 26, the communications device determines that the scheduled event is no longer in progress, and selects the nominal profile.

Of course, profiles may not need to be set manually by a user. A mobile communication device is likely programmed with profiles usage rules, e.g., "Silent profile during calendar events." The user may modify the profile usage rules during an initial set-up process, or at any time in the future. Further, in many instances, a control system is provided by a user's environment, e.g., a central calendar control, which is used to set appointments for one or more persons working in the environment. Thus, a calendar event may be set by a control system or by the user. Profiles may also be set by the control system to insure that everyone participating in a calendar event has quiet mobile communication devices. A number of communication devices may thus be set, or synchronized, by a control system, and the actual mobile communication devices set by means of cable connection, RF, IR, Bluetooth®, or other protocols.

As an example, if the user has a meeting on Thursday from 1:30 pm to 2:30 pm, the user enters the appointment in the mobile communication device's calendar and selects which profile is to be in use during the designated time period for the appointment. One of the options given for that event is the profile to be in use during that time period. The user is able to set this option to any of the profiles on the mobile device. For instance, one of the profiles may direct all callers to a voice mail box which notifies the caller that the user is in a meeting, and the same profile also silences the ring on the phone. When the time for the event arrives, the mobile device records the current profile and changes the settings to those listed in the calendar entries profile. When the scheduled event's time is over, the mobile device then changes the settings back to the setting recorded before the meeting scheduled time.

In an alternate embodiment of the method of the invention, the user may be notified of the impending profile change, e.g., in a pop-up window on the UI and/or an audible indication. This is particularly convenient in the case where a control system is used to set calendars without intervention by the user of the mobile communication device.

Thus, a method for using an mobile device calendar to change selected mobile device options has been disclosed. It will be appreciated that further variations and modifications thereof may be made within the scope of the invention as defined in the appended claims.

I claim:

1. A method of automatically changing a profile in a mobile communication device, wherein the mobile communication device is equipped with a calendar mechanism, comprising:

creating a plurality of profiles in the mobile communication device, wherein the plurality of profiles comprise settings for the mobile communication device behavior when receiving incoming calls, and wherein the settings comprise ring volumes that are set for the mobile communication device when a profile is selected;

setting an event begin time and an event end time in the calendar mechanism, wherein the mobile communication device is equipped with the calendar mechanism, wherein the event begin time and the event end time are automatically set by a central control system communicating with the calendar mechanism;

selecting an event profile from the plurality of profiles to be in use during an event, wherein the selected event profile is automatically selected by the central control system;

detecting the beginning time for the event;

recording and storing the selected event profile of the plurality of profiles that was in effect prior to the event begin time;

activating the selected event profile to be in use during the event; and during the mobile communication device power on, detecting whether an event scheduled on the calendar mechanism that was in progress at a last mobile communication device power off has ended, and selecting a profile from the plurality of profiles that determines the ring volume of the mobile communication device to be in use at the time of the mobile communication device power on, wherein the mobile communication device will be restored to the profile of the event in progress at the last mobile communication device power off, unless it is determined that the event in progress at the last mobile communication device power off has ended, and wherein the ring volume comprises a loud ring, a soft ring, or a vibrate-only ring.

2. The method of claim 1 which further includes providing notification to the user before activating the selected event profile.

3. The method of claim 2, wherein the profile directs all callers to a voice mail box which notifies the caller that the user is in a meeting, and sets the device's ring volume to silent.

4. The method of claim 1 wherein said creating the plurality of profiles in the mobile communication device includes creating a profile consisting of selecting a profile, manually setting a profile by the user, and setting a profile by the central control system.

5. The method of claim 1 wherein said setting an event begin time and an event end time includes selecting an event begin time and an event end time by the user and selecting an event begin time and an event end time by the central control system.

6. The method of claim 1 which further includes manually changing to a different profile during an event.

7. The method of claim 1, wherein a central calendar controls all of the participants in a particular event and automatically sets the same profile for each of the participants in the event to the selected event profile.

8. The method of claim 1, wherein a notification is provided by a pop-up window that is displayed on the user interface of the device.

9. A method of automatically changing a profile in a mobile communication device, wherein the mobile communication device is equipped with a calendar mechanism, comprising:
   creating a plurality of profiles in the mobile communication device, wherein the plurality of profiles comprise settings for the mobile communication device behavior when receiving incoming calls, and wherein the settings comprise ring volumes that are set for the mobile communication device when a profile is selected;
   setting an event begin time and an event end time in the calendar mechanism, wherein the mobile communication device is equipped with the calendar mechanism, wherein the event begin time and the event end time are automatically set by a central control system communicating with the calendar mechanism;
   selecting an event profile from the plurality of profiles to be in use during an event, wherein the selected event profile is automatically selected by the central control system;
   detecting the beginning time for the event;
   recording and storing the selected event profile of the plurality of profiles that was in effect prior to the event begin time;
   activating the selected event profile to be in use during the event;
   detecting the end time for the event and restoring the selected event profile in effect prior to the event begin time;
   providing notification to the user before activating the selected event profile;
   allowing the user manually to change to a different profile during the event; and
   during the mobile communication device power on, detecting whether an event scheduled on the calendar mechanism that was in progress at a last mobile communication device power off has ended, and selecting a profile from the plurality of profiles that determines the ring volume of the mobile communication device to be in use at the time of the mobile communication device power on, wherein the mobile communication device will be restored to the profile of the event in progress at the last mobile communication device power off, unless it is determined that the event in progress at the last mobile communication device power off has ended, and wherein the ring volume comprises a loud ring, a soft ring, or a vibrate-only ring.

10. The method of claim 9 wherein said creating the plurality of profiles in the mobile communication device includes selecting a profile, manually setting a profile by the user, and setting a profile by the central control system.

11. The method of claim 9 wherein said setting an event begin time and an event end time includes selecting an event begin time and an event end time by the user and selecting an event begin time and an event end time by the central control system.

12. A method of automatically changing a profile in a mobile communication device, wherein the mobile communication device is equipped with a calendar mechanism, comprising:
   creating a plurality of profiles in the mobile communication device, wherein the plurality of profiles comprise settings for the mobile communication device behavior when receiving incoming calls, and wherein the settings comprise ring volumes that are set for the mobile communication device when a profile is selected;
   setting an event begin time and an event end time in the calendar mechanism, wherein the mobile communication device is equipped with the calendar mechanism, wherein the event begin time and the event end time are automatically set by a central control system communicating with the calendar mechanism;
   selecting an event profile from the plurality of profiles to be in use during an event, wherein the selected event profile is automatically selected by the central control system;
   detecting the beginning time for the event;
   recording and storing the selected event profile of the plurality of profiles that was in effect prior to the event begin time;
   activating the selected event profile to be in use during the event;
   detecting the end time for the event and restoring the profile in effect prior to the event begin time; and
   during the mobile communication device power on, detecting whether an event scheduled on the calendar mechanism which was in progress at a last mobile communication device power off has ended, and selecting a profile from the plurality of profiles that determines the ring volume of the mobile communication device to be in use at the time of the mobile communication device power on, wherein the mobile communication device will be restored to the profile of the event in progress at the last mobile communication device power off, unless it is determined that the event in progress at the last mobile communication device power off has ended, and wherein the ring volume comprises a loud ring, a soft ring, or a vibrate-only ring.

13. The method of claim 12 which includes providing notification to the user before activating the selected profile.

14. The method of claim 12 wherein said creating the plurality of profiles in the mobile communication device includes selecting a profile, manually setting a profile by the user, and setting a profile by the central control system.

15. The method of claim 12 wherein said setting an event begin time and an event end time includes selecting an event begin time and an event end time by the user and selecting an event begin time and an event end time by the central control system.

16. The method of claim 12 which further includes manually changing to a different profile during an event.

17. A method of automatically changing a profile in a mobile communication device, wherein the mobile communication device is equipped with a calendar mechanism, comprising:
    creating a plurality of profiles in the mobile communication device, wherein the plurality of profiles comprise settings for the mobile communication device behavior when receiving incoming calls, and wherein the settings comprise ring volumes that are set for the mobile communication device when a profile is selected, wherein said creating profiles in the mobile communication device includes selecting the profile, manually setting the profile by the user, and setting the profile by a control system;
    setting an event begin time and an event end time in the calendar mechanism, wherein the mobile communication device is equipped with the calendar mechanism, wherein the event begin time and the event end time are automatically set by a central control system communicating with the calendar mechanism;
    selecting an event profile from the plurality of profiles to be in use during an event, wherein the selected event profile is automatically selected by the central control system;
    detecting the beginning time for the event and;
    recording and storing the selected event profile of the plurality of profiles was in effect prior to the event begin time;
    providing notification to the user that the mobile communication device will be activating the selected event profile;
    activating the selected event profile to be in use during the event;
    detecting the end time for the event and restoring the selected event profile in effect prior to the event begin time; and
    during the mobile communication device power on, detecting whether an event scheduled on the calendar mechanism that was in progress at a last mobile communication device power off has ended, and selecting a profile from the plurality of profiles that determines the ring volume of the mobile communication device to be in use at the time of the mobile communication device power on, wherein the mobile communication device will be restored to the profile of the event in progress at the last mobile communication device power off, unless it is determined that the event in progress at the last mobile communication device power off has ended, and wherein the ring volume comprises a loud ring, a soft ring, or a vibrate-only ring.

18. The method of claim 17 wherein said setting an event begin time and an event end time includes selecting an event begin time and an event end time by the user and selecting an event begin time and an event end time by the central control system.

19. The method of claim 17, wherein a central calendar controls all of the participants in a particular event and automatically sets the same profile for each of the participants in the event to the selected event profile.

* * * * *